United States Patent [19]
Anderson

[11] Patent Number: 5,581,748
[45] Date of Patent: Dec. 3, 1996

[54] PHASE REGISTER FOR SYNCHRONIZATION OF MULTIPLE SIGNAL PROCESSORS

[75] Inventor: Eric C. Anderson, San Jose, Calif.

[73] Assignee: Apple Computer, Inc., Cupertino, Calif.

[21] Appl. No.: 567,856

[22] Filed: Dec. 6, 1995

Related U.S. Application Data

[63] Continuation of Ser. No. 882,460, May 12, 1992, abandoned.

[51] Int. Cl.⁶ .................................. H04L 7/08; H04J 3/06
[52] U.S. Cl. .......................... 395/557; 375/357; 375/363; 375/368; 395/551
[58] Field of Search ................................ 370/105.1, 100, 370/82, 85.1; 375/116, 114, 111, 118; 360/14.3; 340/147; 364/DIG. I; 395/550

[56] References Cited

U.S. PATENT DOCUMENTS

| | | | |
|---|---|---|---|
| 4,161,719 | 7/1979 | Parikh et al. | 340/147 |
| 4,611,336 | 9/1986 | Fryer | 375/111 |
| 4,811,367 | 3/1989 | Tajika | 375/116 |
| 4,860,285 | 8/1989 | Miller et al. | 370/100 |
| 4,937,741 | 6/1990 | Harper et al. | 364/200 |
| 4,965,814 | 10/1990 | Yoshida et al. | 375/111 |
| 4,977,582 | 12/1990 | Nichols et al. | 375/118 |
| 5,040,081 | 8/1991 | McCutchen | 360/14.3 |
| 5,251,239 | 10/1993 | Turban et al. | 375/114 |
| 5,263,028 | 11/1993 | Borgnis et al. | 370/105.1 |
| 5,289,465 | 2/1994 | Mouro et al. | 370/82 |
| 5,301,195 | 4/1994 | Hasegawa | 370/105.1 |
| 5,371,740 | 12/1994 | Mouro et al. | 370/85.1 |

FOREIGN PATENT DOCUMENTS

| | | |
|---|---|---|
| 2245396A | 1/1992 | United Kingdom . |
| WO85/05707A1 | 12/1985 | WIPO . |

*Primary Examiner*—Kevin A. Kriess
*Assistant Examiner*—Majid A. Banankhah
*Attorney, Agent, or Firm*—Blakely, Sokoloff, Taylor & Zafman

[57] ABSTRACT

In a computer system having two processors both of which are used to process frames, a method for synchronizing a first set of frames corresponding to the first processor with a second set of frames corresponding to the second processor. A value stored in a register is initialized at frame boundaries of the second set of frames. This register value is repeatedly incremented during the frames of the second set of frames so that it increases within the frames. The value in the register is read. A timer value which provides a timing reference for each frame of the first set of frames is read. The value stored in the register when a frame boundary of the second set of frames had occurred is computed, based on the read register value and the read timing value. Based on the computed values, a frame length of the first set of frames is adjusted to maintain or improve frame synchronization between the two frame sets. Furthermore, data synchronization is provided in a similar fashion.

16 Claims, 10 Drawing Sheets

Unsynchronized Frames

Synchronized Frames

Time

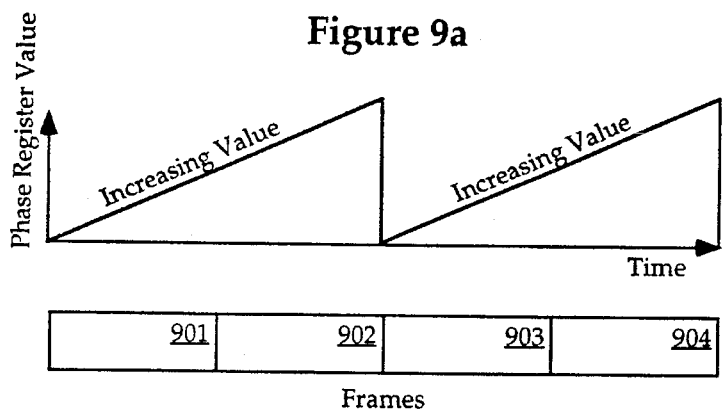
Figure 9a
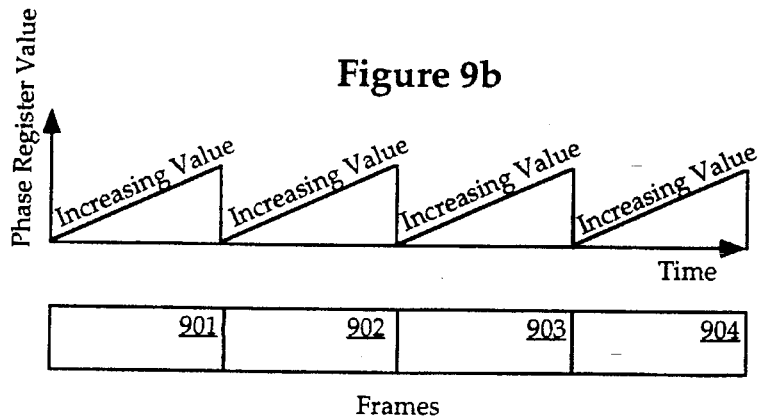
Figure 9b
Figure 10

Lead condition

Lag condition

Input Buffering

Output Buffering

PHASE REGISTER FOR SYNCHRONIZATION OF MULTIPLE SIGNAL PROCESSORS

This is a continuation of application no. 07/882,460, filed May 12, 1992, now abandoned.

FIELD OF THE INVENTION

The present invention relates to the field of digital signal processing on a digital computer. More particularly, the present invention pertains to implementing a phase register to synchronize the frames and data streams of multiple signal processors.

BACKGROUND OF THE INVENTION

Time correlated data such as sounds, images, speech, etc. are by their nature analog (i.e. continuous). However, computers are, for the most part, digital (i.e. discrete). In order for a digital computer to process analog signals, the analog signals are first converted into digital signals which represent the analog signals. This is accomplished by repeatedly sampling the analog signals in short time intervals and converting each sampled value into a digital value. The resulting digital signal is then processed by the digital computer. The processing of such digitized signals by a computer is known as digital signal processing.

For real-time digital signal processing, the computer accepts and processes incoming samples at the average rate that the samples are being generated by an input process, and produce outgoing signals at the average consumption rate of an output process. One method for accomplishing this is to wait for an input sample. Once the sample is received, it is processed and then outputted. In other words, single samples are processed one at a time.

A more efficient digital signal processing method involves buffering input samples so that processing can be effected on groups of samples rather than just individual samples. Such an approach is known as frame-based processing. FIG. 1 is a diagram of frame-based processing. The basic idea behind frame-based processing is to slice time into short periods, known as frames, within which all the required data processing for that frame is completed. Digitized signals are divided into groups which represent the same amount of time as a frame. For example, Compact Disc audio data runs at a rate of 44, 100 samples per second. Given a frame rate of 10 milliseconds (100 frames per second), there would be 441 samples per frame. During each frame, the required program code executes on the collected input samples, and the resulting out-put data is dumped into an out-put buffer. FIG. 2 shows an example of frame buffering.

Thereby, frame-based processing reduces the task switching overhead when multiple tasks are being run. For example, given four tasks and a rate of 100 samples per frame, frame-based processing allows for switching between the tasks four times rather than 400 times per frame. The drawback of frame-based processing is increased latency. For sample-at-a-time processing, one sample delay between input and output is incurred. For flame-based processing, the latency increases to two frames. For applications where this is not an issue, frame-based processing is advantageous.

The throughput of the frame-based processing system can be increased by adding additional slave processors for processing in parallel with the master processor. However, the frames of the additional processors should be synchronized with respect to each other along with the frames of the master processors. The reason why synchronization is important is so that data can be streamed between the multiple processors. If the frames of several processors are based on different clock sources, they will drift relative to each other over a period of time.

FIGS. 3a and 3b show synchronized and unsynchronized frames, respectively. Passing frames of data between two processors having unsynchronized frames results in periodically having one too many frames or not having an available frame when one is needed. An extra frame contains extra data and must be dropped, while a missing frame requires replication. Unless some other action is taken, a disruption will result in audio or telecommunication applications. Also, unacceptable data loss will result for data communication applications. Thus, in order to effectively pass frames of data between different processors, the frames on the multiple processors should be synchronized.

One prior art method for synchronizing the frames is to hardwire a common clock to all the processors. Thereby, the frames of each processor are being processed at the same time in reference to the common clock. A disadvantage to this synchronization method is that running additional wires to make the clock connections may cause serious electromagnetic interference (EMI) problems. Another disadvantage is that it is difficult to expand such a system (i.e. add more processors) because the common clock must be bused to any additional processors. Yet, another disadvantage is that the additional clock wires take up room on a printed circuit board. If there is no common clock or frame synchronization signal between processors in hardware, accurate crystals must be used as clock sources for each processor.

However, these clocks are not precise enough to achieve processor frame synchronization. Typical crystal clock tolerances will allow frames to be synchronous to within ±0.01%. While ±0.01% seems to be very precise, this small imprecision is, nevertheless, unacceptable. For example, the number of frame for a 100% error is calculated by dividing the frame time by the frame time error. Assuming a 10 millisecond frame time (i.e. 100 frames per second) and assuming that both crystal clocks are at the extreme opposite ends of their tolerances, the number of frames for a 100% error would be:

$$10 \text{ ms}/(2 \times 0.01\% \text{ of } 10 \text{ ms}) = 10 \text{ ms}/2 \text{ } \mu s = 5000$$

According to the above calculations, a ±0.01% crystal clock tolerance results in totally unsynchronized frames every 5000 frames, in a worst case situation. At 100 frames per second, a full frame with either be dropped or an extra frame will be generated every 50 seconds.

Another problem with real-time frame-based processing between digital signal processors is that of synchronizing I/O data streams with the frames. Even though the frames of the slave processors are synchronous with the frames of a master processor, this does not guarantee that the input and output data streams being processed are synchronized with the frames.

Therefore, what is needed is an apparatus and method for synchronizing the frames of slave processors with the frames of a master processor, which can also be used to effectively synchronize input and output data streams with the frames.

SUMMARY AND OBJECTS OF THE INVENTION

In view of the problems associated with synchronizing the frames of additional processors with each other and with the frames of the master processor, one object of the present invention is to provide a very precise dynamic synchronization method.

Another object of the present invention is to implement a synchronization method with minimal electro-magnetic interference problems.

Another object of the present invention is to provide a synchronization method which allows the computer system to easily expand by adding additional processors.

Another object of the present invention is to provide a software synchronization mechanism which is not time critical.

Yet another object of the present invention is to synchronize input and output data streams with the frames.

In a frame-based computer system having a master processor and a slave processor, the present invention provides an apparatus and method for synchronizing the slave frames with the master frames and for synchronizing I/O data streams with the frames. A phase register is loaded with a value of 0 when the mth frame boundary occurs. The phase register value is then incremented at a frequency which is greater than the I/O sampling rate. This process is repeated for successive frames such that the phase register value describes an increasing ramp function over time. Each ramp corresponds to m frames. In the currently preferred embodiment, a dual buffer system is implemented (m=2). Following system start-up, the present invention generates a transition frame for the slave processor to achieve initial synchronization. The length of the transition frame depends on the current value in the phase register.

Once the slave frames have been initially synchronized with the master frame, the present invention provides a method which continually adjusts synchronization of the slave frames. This is accomplished by reading the phase register during the slave frame. A timer/counter value local to the slave processor is also read. Based on the phase register value and the timer value, calculations can determine what the phase register value was at a master frame's boundary. If the calculated phase register value is relatively high, a successive slave frame is made longer. If the value computed is relatively low, a successive slave frame is made shorter. The present invention also accounts for system delays such as program delays, bus delays, and timer delays.

Note that while the ±0.01% crystal error causes synchronization problems over time, the frequencies are precise enough over short periods, such as over the period of a single frame, to be used to maintain long-term synchronization.

Furthermore, the present invention also provides for data synchronization of two separate I/O channels coupled to the master and slave processors. First, the slave phase register value at a slave frame's boundary is calculated based on the current value read from the slave processor's phase register and the slave processor's timer. Next, this calculated phase register value is converted to a buffer address by shifting out the prescaler bits and adding the base address. Extra or missing data samples are determined by noting any subsequent changes to the buffer address. A sample rate converter is implemented to provide data recalibration, as necessary.

BRIEF DESCRIPTION OF THE DRAWINGS

FIGS. 9a–b respectively illustrate phase register values and converted phase register values in reference to a number of frames as a function of time.

FIG. 10 illustrates a transition frame which establishes initial synchronization following start-up.

DETAILED DESCRIPTION

A method and apparatus for synchronizing the frames of one or more slave processors to the frames of a master processor and synchronizing input/output data samples by implementing a phase register is described. In the following description, for the purposes of explanation, numerous specific details such as register and buffer sizes, frequencies, frame lengths, timer values, etc. are set forth in order to provide a thorough understanding of the present invention. In particular, this description discloses some specific implementation details, such as down counters and up counters which either underflow or overflow. It should be noted that the present invention can be implemented by substituting down counters with up counters and vice versa. Likewise, counters that use comparators rather than binary borrow/carry registers can be implemented. It will be apparent, however, to one skilled in the art that the present invention may be practiced without these specific details. In other instances, well-known structures and devices are shown in block diagram form in order to avoid unnecessarily obscuring the present invention.

Figure 1:
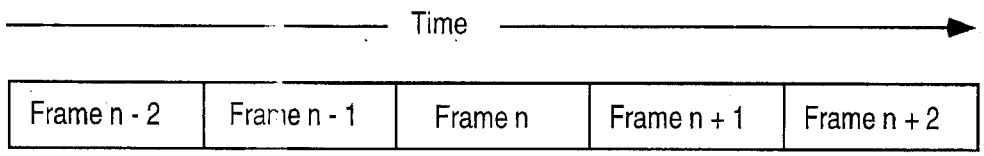
FIG. 1 is an illustration of frame-based processing.
Figure 2:
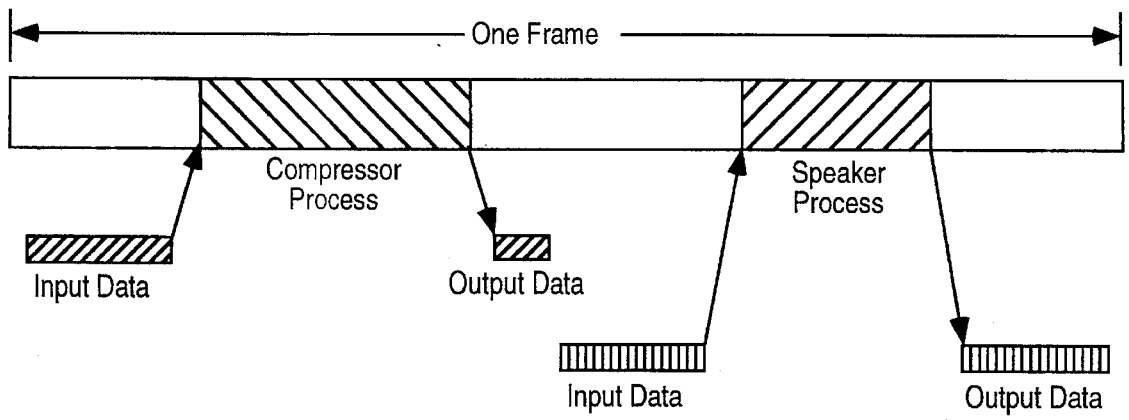
FIG. 2 illustrates an example of frame buffering.
Figure 3A:
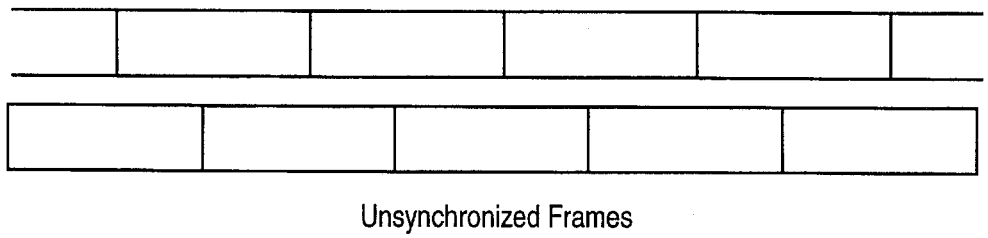
FIGS. 3a–b illustrate synchronized and unsynchronized frames, respectively.
Figure 3B:
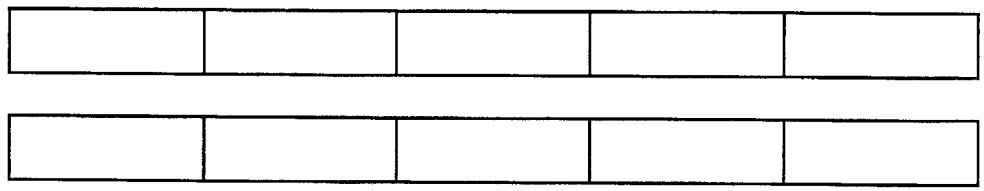
Figure 4:
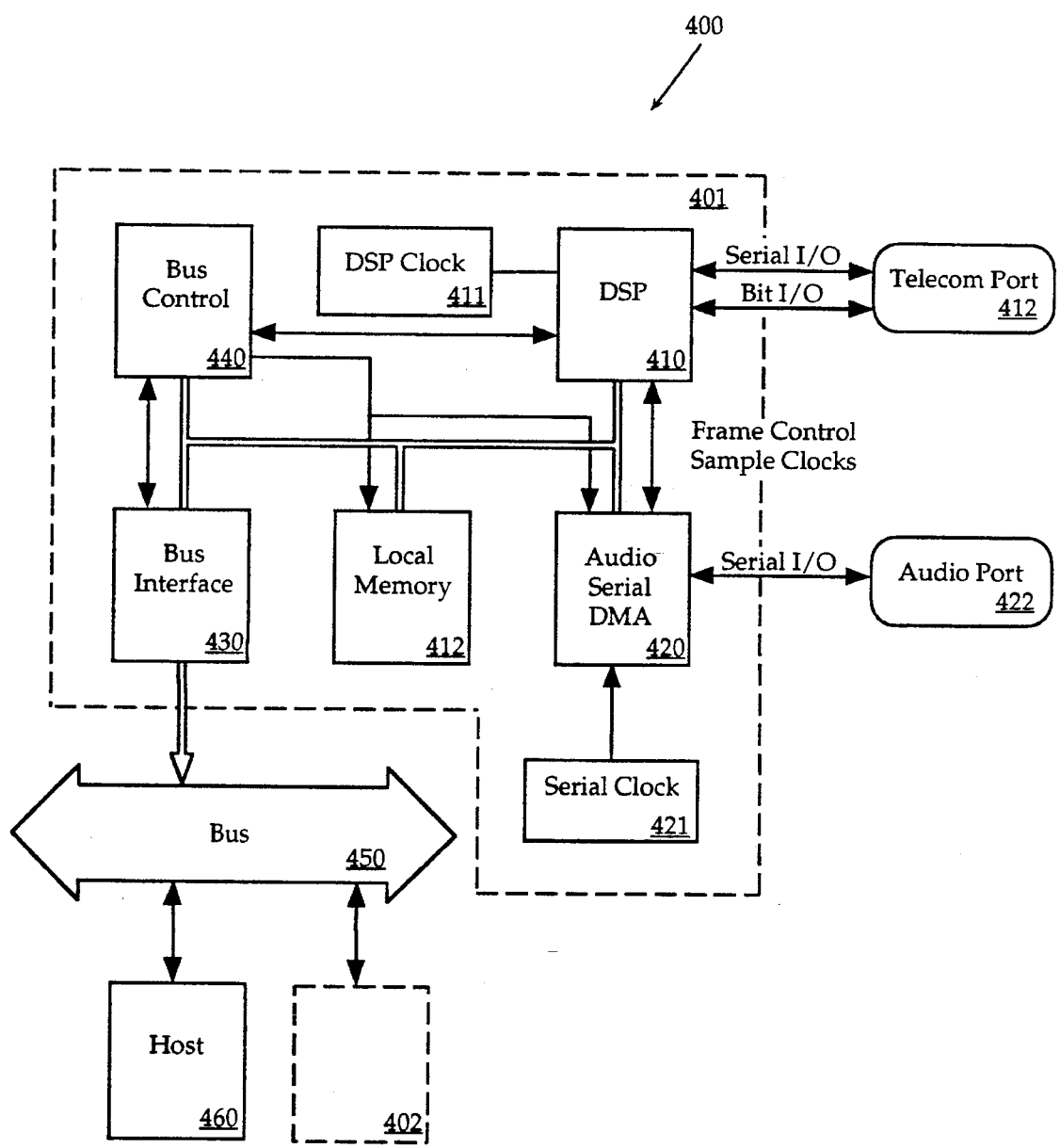
FIG. 4 illustrates a processing system upon which the preferred embodiment of the present invention can be practiced.

Referring to FIG. 4, the processing system upon which the preferred embodiment of the present invention may be practiced is shown as 400. Apparatus 400 comprises two processing units 401 and 402, host 460, and a bus 450 coupling the processing units and the host. Processing units 401 and 402 are comprised of similar hardware. Either of these two processing units 401 and 402 can be made as the master processor with the other being the slave processor.

Processing unit 401 is comprised of a digital signal processor 410, such as a WE® DSP3210 available from AT & T. DSP 410 is driven by a DSP clock 411 which provides a timing reference. Processing system 401 is also coupled to an audio serial DMA (direct memory access) circuit 420 which facilitates transfers between a local memory 412 and/or information transferred on bus 450. In some embodiments, there is no local memory 412, so DMA circuit 420 may allow DMA transfers on bus 450. This may include information transferred via bus 450 from a host processor circuitry 460, and/or host processor memory. In addition, audio serial DMA circuit 420 provides output to an audio port such as 422 in a serial fashion as driven by a serial clock 421. DSP 410 is also coupled to a telecom port 412 for transmission of serial and bit input/output information, such as fax and/or computer data information transmitted over telephone lines.

Processing system 400 further comprises a bus control unit 440 which is coupled to DSP 410 and a bus interface circuit 430 which facilitates communication between 401 and bus 450. Bus 450 may be either the computer bus in which 401 is installed, or may be a host bus coupled to a host processor 460. Bus 450 may be coupled to other devices such as input/output units, memory, peripheral interfaces (not shown) for providing various capabilities within the system.

Processing units 401 and 402 shown in FIG. 4 may be implemented as circuitry residing on a motherboard (main circuitry board) of a computer system or, in another embodiment, it may be implemented as an expansion card inserted into a slot in a computer system and thus communicate with host processor 460 over a communication bus 50. In one embodiment, host 460, bus 450, and processing units 401 and 402 may be one of the Macintosh® family of personal computers such as the Macintosh® SE or Macintosh® II manufactured by Apple Computer, Inc. of Cupertino, Calif. (Apple and Macintosh® are registered trademarks of Apple Computer, Inc.). Host 460 comprises one of the 68000 families of microprocessors, such as the 68000, 68020, or 68030 manufactured by Motorola, Inc. of Schaumburg, Ill.

It should be noted that the structure of processing unit 401 is shown as one embodiment and is not necessary for practicing the present invention. It should also be noted that in another embodiment, additional DSPs may be coupled to a bus 450 such that a multiprocessing environment may be employed to provide enhanced capabilities. Furthermore, a separate host processor is not mandatory. It will be appreciated by one skilled in the art that many departures and modifications of the circuitry shown in FIG. 4 may be employed to practice the present invention.

Figure 5:
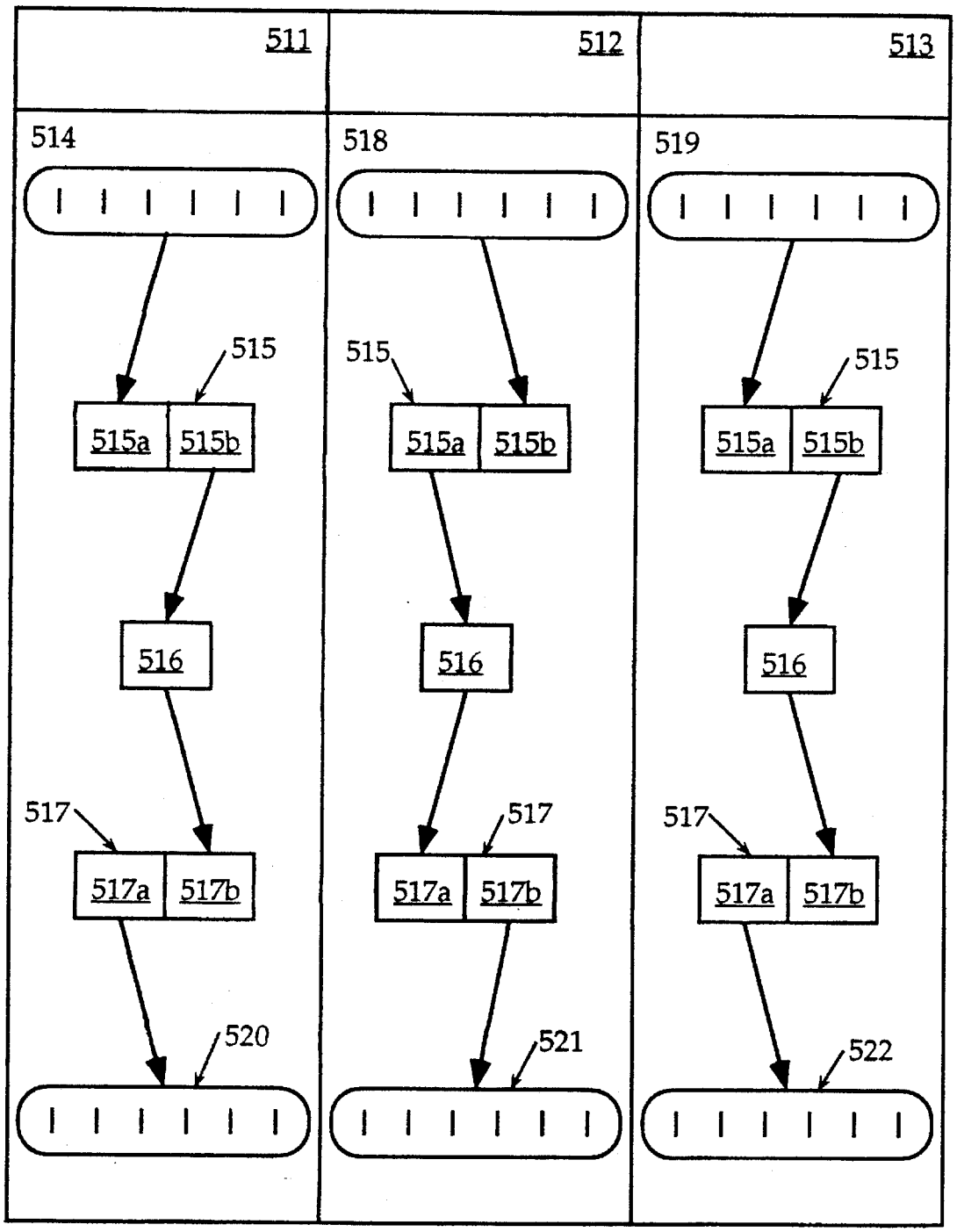
FIG. 5 illustrates a dual-buffer frame-based processing system.

The currently preferred embodiment of the present invention is applied to a dual-buffer frame-based processing system, as shown in FIG. 5. Three frames 511, 512, and 513 are shown. During frame 511, input samples 514 are input and stored in input buffer 515. The size of input buffer 515 is made to be twice the size of a frame, so that two frame's worth of data can be stored. Input samples 514 are stored in the lower half 515a of buffer 515. Previous samples stored in the upper half of input buffer 515b are taken and processed according to a particular task 516. The result is then dumped into the upper half 517b of output buffer 517. Previously computed output data stored in the lower half 517a are outputted as processed samples 520. Output buffer 517 is made to be twice the size of a frame, so that two frame's worth of processed samples can be stored. During frame 512, input samples 518 are input and stored in the upper half 515b of input buffer 515. The previously input samples in 515a (i.e., samples 514) are taken and processed according to a particular task 516. The result is dumped into the lower half 517a of output buffer 517. Previously computed samples from frame 511 are outputted as processed samples 521. During frame 513, samples 519 are input and stored in the lower half 515a of input buffer 515. Previously stored samples from frame 512 (i,e, samples 518) are then processed according to a task 516 from buffer 515b. The result is dumped into the upper half 517b of output buffer 517. Samples computed during frame 512 are outputted as processed samples 522.

This dual-buffer frame-based process is repeated for subsequent frames by storing input samples alternately in the upper and lower halves of input buffer 515, processing the samples according to a task and outputting process samples alternately through the upper and lower halves of output buffer 517. Thus, in a current frame, samples which were inputted in the previous frame are being processed and dumped into an output buffer during the current frames and outputted during the next frame. Hence, n equals two for this dual buffered format. Note that the present invention can be implemented with other formats wherein n–3, 4, 5, etc. If larger buffers are utilized, input to output latency will increase.

Note that task 516 may actually be composed of many different tasks in a given instance, and that the data from the input buffers may or may not be processed and stored in the output buffer. For example, data may be processed from the input data stream and directed to a disk file, and data from another disk file may be processed and fed into the output buffer.

Figures 6, 7:
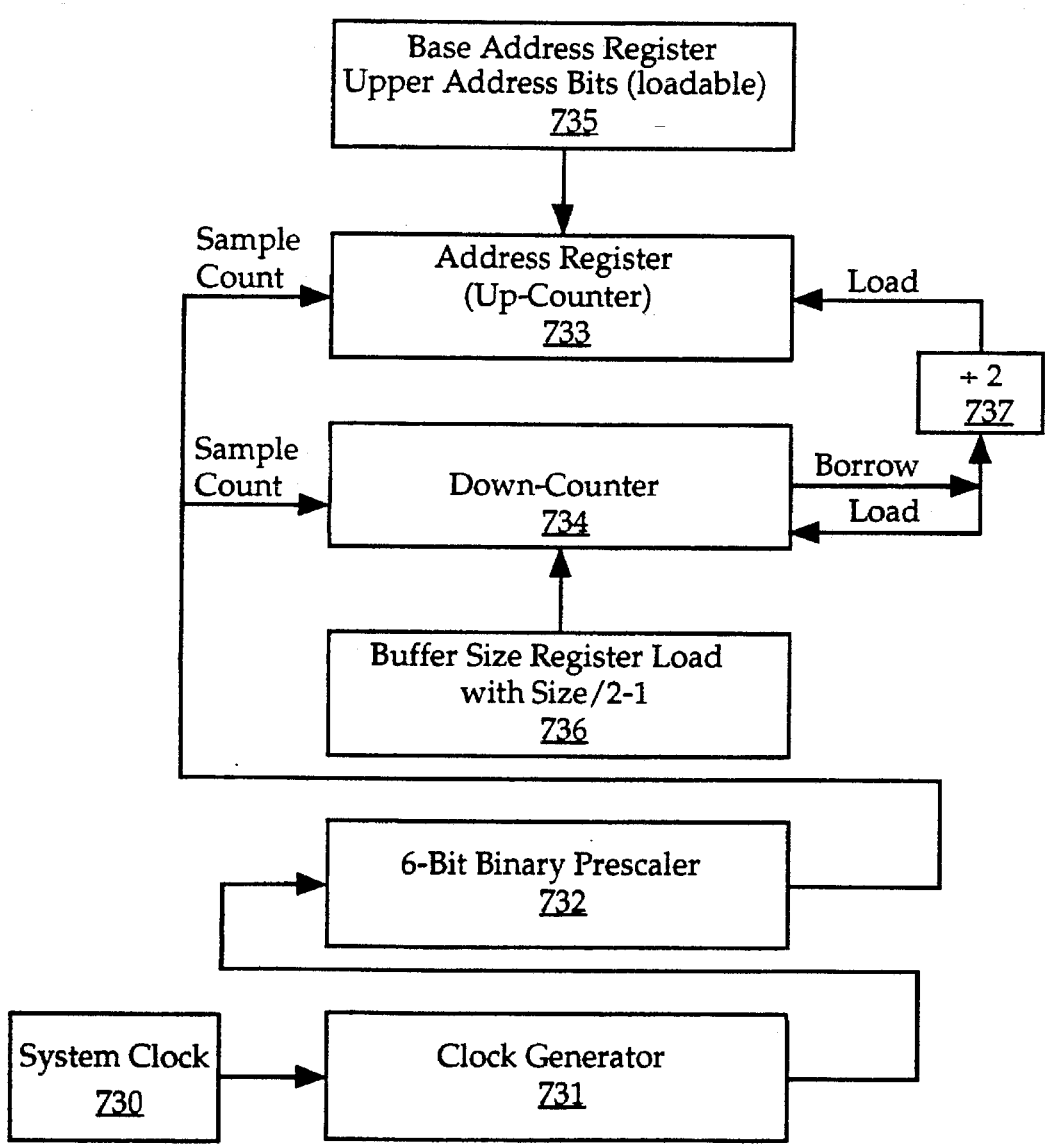
FIG. 6 illustrates a phase register.
FIG. 7 is a block diagram which illustrates how the phase register can be incorporated into a DMA controller to move data samples to and from memory for an I/O device.

As additional processors are added to increase the throughput of the overall system, the present invention synchronizes the frames of each additional slave processor to those of the master processor. This is accomplished by implementing a master phase register to synchronize the frames of the slave processors. A phase register is shown in FIG. 6. In the currently preferred embodiment, the phase register is a 16-bit register comprised of the ten lowest bit from an address register 601 followed by six prescaler bits 602. The sixteen bit resolution provides for the synchronization to be accurate to within a small fraction of a sample period. In alternative embodiments, the phase register can be enlarged to encompass more bits for accommodating larger buffers or for achieving more accurate synchronization.

The address register is a register which contains the address of a particular sample stored in the output buffer. When a stream of data samples is transferred from the output buffer to an input/output (I/O) device (e.g. an audio digital-to-analog converter), a direct memory access controller (DMA) or some other type of data mover is used to send the data samples over a serial or parallel bus. The data samples are sequentially read from the output buffer and sent to the I/O device once per sample period. The address register is used to store the address of the next sample which is to be read from the output buffer. Once the last sample in the output buffer has been sent, the address register is reset back to the address of the first sample in the output buffer.

Note that in the currently preferred embodiment, the address is a longword address since stereo data is being transferred in the format of two 16-bit values. Also, note that in the currently preferred embodiment, actual DMA transfers are actually done on four sample boundaries and buffered in 16-byte FIFO's. This quad word transfer technique is often used to increase bus efficiency when DRAM memory is used. The implications of this arrangement are that the address register is really a longword register (i.e., it increments in steps of 4 bytes). This is implemented by wiring bits A0 and A1 to zero and feeding the sample count pulse to bit A2. Thus, the register is 30 counter bits plus two hardwired zero bits. Bits A2 thru A11 are the upper 10 bits of the phase register. Bits A12 thu A31 are the base address for the buffer. Since the DMA channel (not shown) works on quadword boundaries, it is actually triggered to fetch or store a quadword from/to its FIFO buffers every four sample counts.

The six prescaler bits comprising the lower six bits of the phase register are generated by a six-bit prescaler. The prescaler counts from 0 to 63 for each sample period. In effect, the prescaler divides a sample period into 64 equal parts, thereby increasing the resolution.

FIG. 7 is a block diagram illustrating how the phase register can be incorporated into a DMA controller. System clock 730 is the internal clock for the overall computer system. It can also be a separate sample rate clock. Clock generator 731 converts the frequency of system clock 730 into a frequency which is equal to $2^n$ times the sample rate, where n equals the number of prescaler bits. For a 6-bit prescaler, the clock generator 731 frequency would be $2^{6=64}$ times the sample rate. The output pulses from clock generator 731 are used by prescaler 732 to generate sample pulses. For a 6-bit prescaler, the prescaler generates one count pulses every $2^{6=}64$ pulses from clock generator 31. The following example details how count pulses are generated. Given a system clock frequency of 49,152 MHz, a sample rate of 24,000 samples/second, and a 6-bit prescaler, clock generator 731 would convert the system clock 730 frequency of 49.152 MHz into a frequency of $2^6 \times 24,000=$ 1,536 MHz (i.e. divide by 32).

Prescaler 732 is incremented by one each time it receives a clock pulse from clock generator 731. Since the prescaler has six bits, is is sequentially incremented by one from 0 to 63 and then rolls over back to 0, and the process is repeated. Each time prescaler 732 rolls over (i.e. goes from a value of 63 back to 0), it generates a count pulse. Thus, a count is generated every 64 clocks from the clock generator.

The count pulse generated by prescaler 732 is inputted into address register 733 and down-counter 734. Address register 733 is thirty-two bits long. As described earlier, only thirty bits are used because in the currently preferred embodiment, longwords rather than bytes are being transferred by the DMA controller. The upper 30 bits of the address register are loaded from the base address register every other frame. The value in the base address register contains an upper 20 bit address portion with the lower 12 bits hardwired to zero. This ensures that the start value in the phase register is always zero and forces the buffer to be on $2^{12}$ byte or 4096 byte boundaries.

The base address is loaded by software so that the base address register contains the address of the data buffer being transferred. The address is on $2^{12}$ byte boundaries, or 4096 bytes. This is room for up to 1024 samples at 32 bits per stereo sample pair. Note that two different base and address registers are required if data is to be transferred both into and out of the system. The second register set is part of the DMA unit.

A down-counter 734 is initially loaded with a value stored in the buffer size register 736. It is decremented by one each time it receives a count pulse from prescaler 732. In the presently preferred embodiment, the output buffer size is limited to 1024 longwords. (For 48 kHz stereo sound and 10 ms frames, a double buffer size of 960 longwords is required). Since the counter counts half-buffers, down-counter 734 needs to be a 9-bit counter ($2^{9=512}$). However, it would be obvious to one skilled in the art that for larger buffers, the down-counter size can be increased.

Down-counter 734 underflows when either the half-buffer point or end-point has been reached. The underflow generates a borrow which instructs buffer size register 736 to reload down-counter 734. The underflow is generated every half-buffer, i.e., for a buffer of 960 samples, the underflow occurs every 480 samples. The borrow is also fed into a divided-by-two register 737 which outputs a pulse for every other borrow pulse. Thus, a pulse is generated every buffer, or every 960 samples in teh example. The output pulse from the divide-by-two register 737 signals base address register 735 to reload address register 733. Thereby, address register 733 is reloaded with the base address of the output buffer each time the end-point of the output buffer is reached.

Buffer size register 736 is software loaded with a value equal to the size of the output buffer divided by two and then subtracting one. For example, a 10 millisecond frame period and 44,100 samples per second yields 441 samples per frame. Given a double buffering format, the output buffer size must be large enough to store 882 samples. Hence, buffer size register 736 is software loaded with the value (882/2)−1=440, to support the given frame and sample rate.

In the currently preferred embodiment, the phase register is comprised of sixteen bits with the upper ten bits being A2 through A11 of the address register, and the lower six bits of the phase register being the six prescaler bits. Thus, the value stored in the phase register is incremented by one for each count pulse generated by the prescaler. The phase register is reloaded every other frame.

Thereby, the phase register counts from zero to ((buffer size−1) * $2^n+2^n-1$) every two frames, where n is the number of prescalar bits. For the example given above (i.e. 10 ms frames, sample rate of 44,100 sample per second, and buffer size of 882), the phase register would count from 0 to ((882−1) * 64+63)=56,447 every two frames. Note that the value of the phase register is reset to zero every other frame, but the address is not reset to zero. This is due to the fact that the upper address bits are reloaded from the base address register. Consequently, the address is reset to the base address. The phase register is, in effect, a binary synchronous counter.

Note that another embodiment of the phase register is to use a synchronous counter fed by the 64X prescaler clock, and synchronously reset the counter when it reaches the correct value. Thus, the phase register does not have to be implemented within the DMA channel, but can be external to it. The only requirements are that the 64X clock is available, and a synchronous reset pulse is available that sets the phase register back to zero when the address register is reloaded.

Phase Register Flowchart

Figure 8:
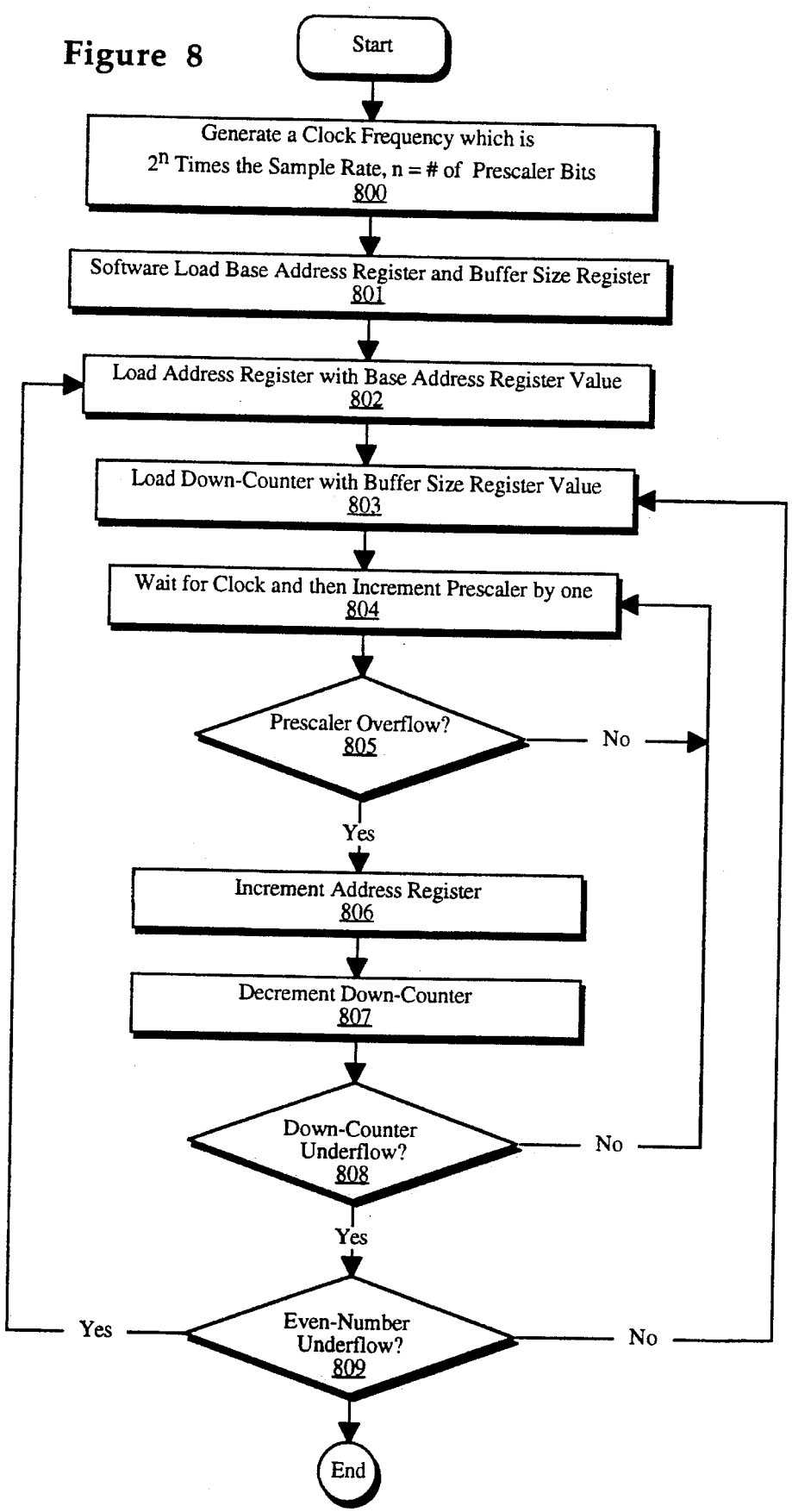
FIG. 8 is a flowchart illustrating the steps for generating the values to be stored in the phase register.

FIG. 8 is a flowchart illustrating the steps for generating the values to be stored in the phase register. First, a clock frequency is generated which is $2^n$ times the sample rate, where n is the number of prescaler bits, step 800. Next, the base address register and the buffer size register are software loaded with the output buffer's base address and ((output buffer's size/2)−1), respectively, step 801. The value in the base address register is loaded into the address register, step 802. Likewise, the value in the buffer size register is loaded in the down-counter, step 803. The prescaler is incremented by one at the clock frequency, step 804. The prescaler is checked to determine whether it have overflowed, step 805.

If the prescaler had not overflowed, then step 804 is repeated. Otherwise, the address register is incremented by one, step 806, and the down-counter is decremented by one, step 807. The down-counter is then checked to determine whether it had underflowed. If the down-counter had not underflowed, then the process is returned to step 104 (increment prescaler). Otherwise, a determination is made as to whether the underflow was even-numbered or an odd-numbered underflow, step 809. If it were even-numbered, then the process is returned back to step 802. Otherwise, the process is returned back to step 803. The phase register value is comprised of the address register bits and the prescaler bits as described earlier.

An Example of the Phase Register Operation

An example is now offered to demonstrate a simple operation of the phase register. Given a buffer size of 4 samples (i.e. two samples per frame), the buffer size register is software loaded with the value (4/2)−1=1. Likewise, the base address register is software loaded with the output buffer's base address. The prescaler is incremented by one for each clock generator pulse. Given a 2-bit prescaler, the prescaler would count 0, 1, 2, 3 for each sample. Thus, the phase register will count from zero to ((4−1) * 4+3)=15 every two frames. Table 1 below shows the values for the various registers for successive clock generator pulses. For this example, the base address is assumed to be 10100.

TABLE 1

| Clock Generator Pulse | Down Counter Register | Address Register | Pre-scaler | Phase Register | Description |
|---|---|---|---|---|---|
| 1 | 1 | 10100 | 00 | 0000 | Sample 1, Frame 1 |
| 2 | 1 | 10100 | 01 | 0001 | Count |
| 3 | 1 | 10100 | 10 | 0010 | Count |
| 4 | 1 | 10100 | 11 | 0011 | Count |
| 5 | 0 | 10101 | 00 | 0110 | Sample 2, Frame 1 |
| 6 | 0 | 10101 | 01 | 0101 | Count |
| 7 | 0 | 10101 | 10 | 0110 | Count |
| 8 | 0 | 10101 | 11 | 0111 | Count |
| 9 | 1 | 10110 | 00 | 1000 | Sample 1, Frame 2 |
| 10 | 1 | 10110 | 01 | 1001 | Count |
| 11 | 1 | 10110 | 10 | 1010 | Count |
| 12 | 1 | 10110 | 11 | 1011 | Count |
| 13 | 0 | 10111 | 00 | 1100 | Sample 2, Frame 2 |
| 14 | 0 | 10111 | 01 | 1101 | Count |
| 15 | 0 | 10111 | 10 | 1110 | Count |
| 16 | 0 | 10111 | 11 | 1111 | Sample 1, Frame 3 |
| 17 | 1 | 10100 | 00 | 0000 | Count |
| 18 | 1 | 10100 | 01 | 0001 | Count |
| 19 | 1 | 10100 | 10 | 0010 | Count |
| . | . | . | . | . | . |
| . | . | . | . | . | . |
| . | . | . | . | . | . |

Initially, the address counter is loaded with 10100 and the down-counter is loaded with the value in the buffer size register, which happens to be 1 in this example. The prescaler increments by one for each clock generator pulse. Because the prescaler in this example is two-bits, it generates a count pulse each time it rolls over. In other words, it generates a count pulse every $2^2$=4 clock generator pulses. When a count pulse is generated, the address register is incremented by one, and the down-counter is decremented by one. In the given example, this occurs during clock generator pulses 5, 9, 13, 17, etc., as shown in Table 1. Each time the down-counter underflows, it generates a borrow. Referring back to Table 1, a borrow is generated for clock pulses 9 and 17. When a borrow is generated, the down-counter is loaded with the value stored in the buffer size register. Because of the divide-by-two register, every second borrow (e.g. clock pulse 17) results in the address register being loaded with the value stored in the base address register. Therefore, the value of the phase register, comprised of the lower two address register bits and the two prescaler register bits, is initially zero. It increases uniformly over time and is reset back to zero every other frame.

FIG. 9 illustrates the value of the phase register as a function of time, in reference to four frames 901–904. The linearly increasing ramp is actually a series of incremental steps. The greater the number of bits used in the prescalar, the higher the resolution becomes, which results in a better approximation of the ramp function. It can be seen from FIG. 9a that each ramp corresponds to two frames. This is due to the implementation of a double-buffering scheme, as discussed earlier. However, in the currently preferred embodiment, a simple algorithm converts this double-frame format into a single-frame format, so that each ramp corresponds to one frame. FIG. 9b illustrates the single-frame per ramp format for the four frames 901–904. A double-to-single frame conversion algorithm is shown below.

---

Converted_Phase_Register_Value: =
If    Phase_Register_Value > Max_Value/2
      then Phase_Register_Value − Max_Value/2
      else Phase_Register_Value
endif

---

Max_Value is the maximum phase register value just before it is rolled back to 0 plus one. Each ramp now corresponds to one frame, as shown in FIG. 9b. Also, the ramps are in phase and have the same frequency as the frames. Using our previous example given in Table 1, this calculation becomes Converted_Phase_Register_Value=if PRV>8 then PRV−8 else PRV.

The frames of additional slave processors can be synchronized with the master processor by utilizing the converted phase register value. The requirements for the slave processor are as follows:

1) The slave processor is able to read the master's phase register in a reasonable time (i.e., much shorter than a frame), and the value received represents the value of the phase register at or close to the time received.

2) The slave processor has a local timer/counter running from its own local clock that can generate frame interrupts and can be read, loaded, and started by the slave processor.

3) The slave timer/counter will automatically reload from a timer reload register when it has counted down.

4) The reload value stored in the timer reload register can be updated by software without disturbing the current timer count.

5) The frequency ratio of the timer/counter and the phase register must be known.

6) The maximum value of the phase register must be known.

These requirements are met by a normal bus interconnect between processors and most standard timer/counter configurations. Note that the present invention can be practiced with more limited hardware, such as timers that must be reloaded in software rather than automatically reloading in hardware. However, additional constraints on the sofware are required, such as very fast software response time to reload the timer.

When a slave processor is first initialized, its frames are probably not synchronized with those of the master processor. A transition frame is implemented during start-up in order to initially synchronize the slave processor. The transition frame forces the frame boundaries of the slave processor to be synchronous (within the accuracy allowed by the number of prescaler bits in the phase register) for the next frame. FIG. 10 shows the implementation of a transition frame to establish initial synchronization. Initial slave frames 1000–1002 are asynchronous with the "master" frames 1003–1005. A variable length transition frame 1006 is implemented to initially synchronize the following adjusted slave frames 1007–1009 with the master frames 1010–1012. The transition frame is generated by loading a transition value into the slave processor's timer/counter so that the transition frame is terminated at almost exactly the same time as the master processor's frame to the accuracy allowed by the number of prescaler bits in the phase register. The transition frame calculation will be described in detail in a subsequent portion of this description.

After the initial synchronization with a transition frame, the slave processor is kept in sync by implementing a fine synchronization program. The fine synchronization program instructs the slave processor to fetch the current value in the phase register sometime during each frame. The algorithm described herein does not require any particular conditions be met as to when the phase register is read by the slave processor, as long as it is read sometime during each frame. In addition, it is assumed that immediately after the value of the master phase is received by the slave processor, a snapshot of the slave timer is also taken. These two numbers will be used to ascertain the state of synchronization between the slave and master frames. The phase register value is then converted as described above, so that each ramp corresponds to one frame.

The converted phase register value and the slave timer value can now be used to determine the phase register value at the point that the timer reloads, causing the frame interrupt for the slave processor. Once this value has been determined, it is then possible to determine what actions, if any, are required to maintain or improve synchronization.

It is necessary to take the sampled values (i.e., converted phase register and timer/counter) and compute what the value of the phase register was when the timer reloaded. The calculation proceeds as follows. First, determine the number of timer/counter clock periods which have elapsed since the beginning of this slave frame:

elapsed=timer max−sample value

Next, convert this to phase register units by dividing by the ratio of timer/converted phase register counting rate:

$$\text{phase elapsed} = \frac{\text{elapsed}}{\text{ratio}}$$

Note that the ratio can also be calculated from the maximum timer count and maximum converted phase register count:

$$\text{ratio} = \frac{\text{timer max} + 1}{\left(\frac{\text{phase max} + 1}{2}\right)}$$

Note that this ratio is initially calculated based on the crystal specs of the hardware, assuming no error. This value can be updated over time by taking the adjusted timer reload value that is a result of the fine synchronization process, and plugging it into this formula. This will reduce the error in this calculation from the clock errors (max total error is 0.02%).

Next, determine what the converter phase register value was at the slave frame boundary.

slave phase =
  if    phase elapsed ≧ converted phase sample
  then (converted phase max + 1) − (phase elapsed − converted phase sample)
  else  converted phase sample − phase elapsed.

The two (then-else) portions of the if statement are required to distinguish between a lead and a lag condition.

Given a lag condition (i.e., the slave boundary lags the master boundary), the "else" clause is used:

slave phase=converted phase sample phase elapsed.

Figure 11A:
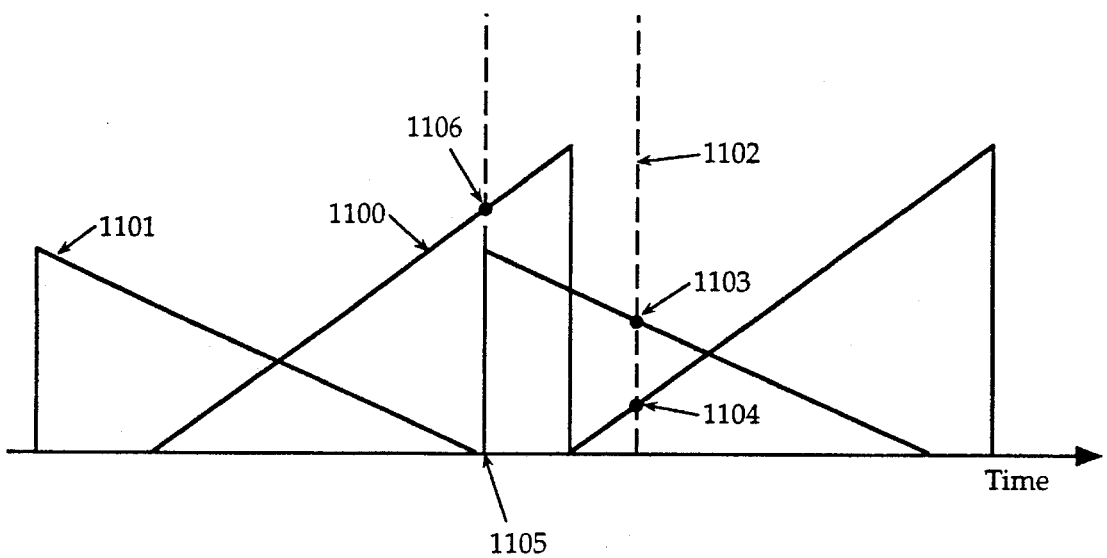
FIG. 11a is a graph illustrating sampled values for a lead condition.
Figure 11B:
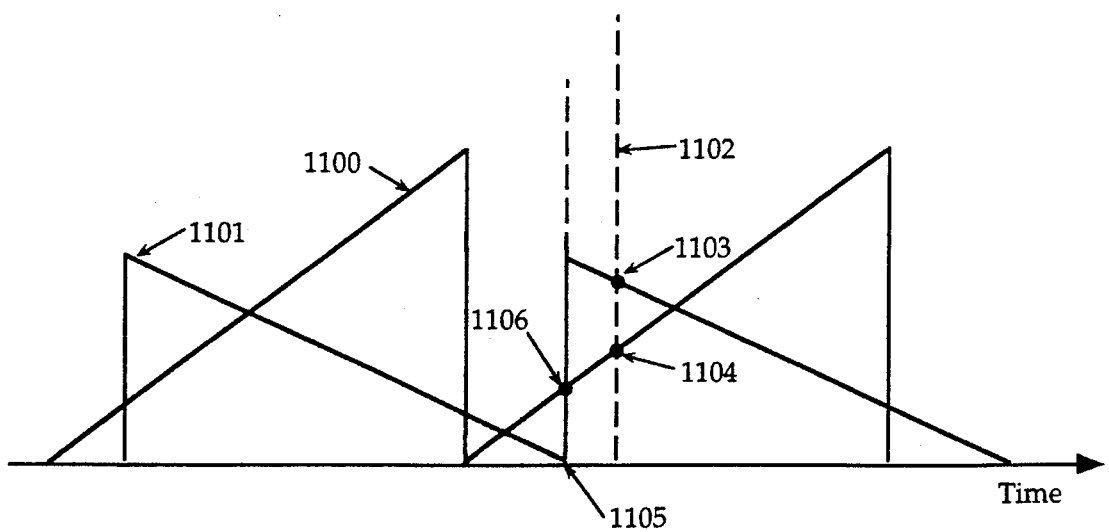
FIG. 11b is a graph illustrating sampled values for a lag condition.

Given a lead condition, the "then" clause is used:

slave phase = (converted phase max + 1) −
(phase elapsed −converted phase sample) =
(converted phase max + 1) + converted
phase sample − phase elapsed FIGS. 11a and 11b illustrate a lead and a lag condition, respectively. The converted phase register 1100 and timer/counter 1101 values are sampled at some point in time 1102. This gives the sampled timer value 1103 and the sampled converted phase register value 1104. The sampled values are then used to calculate the converted phase register value at the instance that the timer/counter reloads 1105. The value is shown as 1106. Based on this value, subsequent frame lengths are adjusted to maintain or improve synchronization. Note that in the lead case, the computed value 1106 is in the upper range of possible values. In the lag case, the computed value 1106 is in the lower range of possible values.

A final calculation can be made at this point:

phase error =
  if slave_phase > half_phase/2
    then slave_phase − max_phase
    else slave_phase
  where half_phase is max converted phase + 1
         max_phase is max converted phase + 1

This gives a positive value for lags and a negative value for leads, in units of phase counts.

The following two examples illustrate the calculations used for given lead and lag conditions.

| Lead Condition: | max phase register = 999 |
|---|---|
| | max converted phase register = 499 |
| | max timer register = 1999 |
| | ratio = (1999 + 1)/(499 + 1) = 4 |
| | sampled phase register = 700 |
| | converted phase sample = 200 |
| | sampled timer = 1180 |
| | elapsed = 2000 − 1180 = 820 |
| | phase elapsed = 820/4 = 205 |
| | since 205 ≧ 200, the "then" clause kicks in: |
| | slave phase = 500 + 200 − 205 = 495 |
| | since 495 > 500/2, then |
| | phase error = 495 − 500 = −5 |

Thus, the slave phase value at the slave frame boundary was 495, indicating that the master frame had not yet begun. This is a phase error of −5. The slave frame is leading the master frame. The slave frame is adjusted to be longer to improve future synchronization.

| Lag Condition: | max phase register = 999 |
|---|---|
| | max converted phase register = 499 |
| | max timer register = 1999 |
| | ratio = (1999 + 1)/(499 + 1) = 4 |
| | sampled phase register = 700 |
| | converted phase sample = 200 |
| | sampled timer = 1220 |
| | elapsed = 2000 − 1220 = 780 |
| | phase elapsed = 780/4 = 195 |
| | since 195 < 200, the "else" clause kicks in: | slave phase = 200 − 195 = 5
phase error = 5

Thus, the slave phase value at the slave frame boundary was 5. This is a phase error of 5. This indicates that the master frame had already begun. The slave frame is lagging the master frame. The slave frame is adjusted to be shorter to improve future synchronization.

By comparing phase error values for successive frames, it can be determined whether the slave frames are drifting closer together or farther away from the master frames. If the computed error is negative and successive computed values are becoming less negative or if the computed error is positive and successive computed values are becoming less positive, then the slave frames are drifting closer to the master frames. No additional action need be taken. However, if the computed error is negative and successive computed values are becoming more negative, this indicates that the slave frames are drifting farther ahead of the master frames. The timer/counter is adjusted to make the slave frames slightly longer. If the computed error is positive and successive computed values are more positive, this indicates that the slave frames are drifting further behind the master frames. The timer/counter is adjusted to make the slave frame slightly shorter.

This fine synchronization process causes the slave's frame boundary to oscillate about the master's frame boundary. Given a 6-bit prescalar, the phase register resolution is 1/64th of a sample period. The variation can be kept well within 1/2 of a sample period (32 phase clocks). An example of a fine synchronization program for performing the frame adjustments is shown below:

```
begin timer adjust
    if perr > max/2
        then                            ;slave frames lead master
            if perr < lasterr
                then                    ;we are not closer
                    timerval = timerval + ratio   ;make
                                                  frames longer
            end if;
        else                            ;slave frame lags master
            if perr > lasterr
                then                    ;we are not closer
                    timerval = timerval − ratio   ;make
                                                  frames shorter
            end if;
    endif;
    lasterr := perr                     ;update lastval
    timer := timerval                   ;update timer
end timer adjust
``` where:

perr=phase error max=maximum converted phase register value+1 lasterr=previous perr from last frame timerval=value loaded into timer for next frame ratio=ratio of timer to phase register counting The timer/counter value is typically adjusted in steps of one phase register count per frame—the maximum resolution available. This is accomplished by using the equivalent timer value, represented by the count ratio, as the adjustment value. Thus, if the phase register is counting at 1,536 MHz as described previously, and the timer rate is 13.75 MHz (72 ns per step), the ratio is approximately 9.

Note that if no change is noted between frames, no action is taken. This is acceptable since the adjustment effect is delayed by one frame, and a zero difference indicates the correction made in the previous frame will begin driving the phase error back toward zero on this frame, which will show up in next frame's calculation.

With ±0.01% crystals and 10 ms frames, the worst case error 0.02% for the beginning of the first synchronized frame 1007 is 0.0002 * 10 ms or 2 μs. This is equal to about 3 phase register steps. This error will only be seen if the transition frame is amost as long as a regular frame. This error will show up in the first synchronized frame 1007 when it calculates the phase error.

The synchronization program described will adjust this worst-case error and keep the frame boundaries within 9 phase counts, or within 9/64ths of a sample period at 48 KHz—well within the desired specification. Below is a table describing this process:

TABLE 2

| Frame # | Calc'd PE | Timer Adj. | Timer Reload | Err in this Fm | Ending PE |
|---|---|---|---|---|---|
| Transition Frame | | | 138888 | −3 | −3 |
| 1 | −3 | 9 | 138897 | −3 | −6 |
| 2 | −6 | 9 | 138906 | −2 | −8 |
| 3 | −8 | 9 | 138915 | −1 | −9 |
| 4 | −9 | 9 | 138924 | 0 | −9 |
| 5 | −9 | 0 | 138924 | 1 | −8 |
| 6 | −8 | 0 | 138924 | 1 | −7 |
| 7 | −7 | 0 | 138924 | 1 | −6 |
| 8 | −6 | 0 | 138924 | 1 | −5 |
| 9 | −5 | 0 | 138924 | 1 | −4 |
| 10 | −4 | 0 | 138924 | 1 | −3 |
| 11 | −3 | 0 | 138924 | 1 | −2 |
| 12 | −2 | 0 | 138924 | 1 | −1 |
| 13 | −1 | 0 | 138924 | 1 | 0 |
| 14 | 0 | −9 | 138915 | 1 | 1 |
| 15 | 1 | −9 | 138906 | 0 | 1 |
| 16 | 1 | 0 | 138906 | −1 | 0 |
| 17 | 0 | 0 | 138906 | −1 | −1 |
| 18 | −1 | 9 | 138915 | −1 | −2 |
| 19 | −2 | 9 | 138924 | 0 | −2 |
| 20 | −2 | 0 | 138924 | 1 | −1 |
| 21 | −1 | 0 | 138924 | 1 | 0 |
| 22 | 0 | −9 | 138915 | 1 | 1 |
| 23 | 1 | −9 | 138906 | 0 | 1 |
| 24 | 1 | 0 | 138906 | −1 | 0 |
| 25 | 0 | 0 | 138906 | −1 | −1 |
| 26 | −1 | 9 | 138915 | −1 | −2 |
| 27 | −2 | 9 | 138924 | 0 | −2 |
| 28 | −2 | 0 | 138924 | 1 | −1 |
| 29 | −1 | 0 | 138924 | 1 | 0 |
| 30 | 0 | −9 | 138915 | 1 | 1 |

In Table 2, the frame numbers are counted starting from frame 1007 in FIG. 10. The first entry in the table is from the transition frame, where the timer reload value is the "correct" value. In our example, this is calculated from 10 ms/72 ns. Also shown is a worst case error from the transition frame —an ending phase error of −3. This is a lead condition, where the slave frames are 3 phase counts too short, and must be increased. The required timer value for zero error in this case is assumed to be 138915, exactly 0.02% higher than the "correct" value.

The "Calc'd PE" in Table 2 is the calculated phase error during that frame, and is simply the value from the "Ending PE" column of the previous row. The "Timer Adj." column shows the adjustment to the timer reload value calculated by the timer adjust program described earlier. Note that it either adds or subtracts the ratio (a value of 9 in this example), or makes no adjustment. The Timer Val. column shows the reload value which will be used to determine the length of the next frame. This delay of one frame is significant. It guarantees that the result of the correction will not be seen until two frames later. This is why we do not adjust the timer value if two PE's in a row are equal. The adjustment from the previous frame has not yet taken effect, and has already started the frame boundary correction toward zero error.

The "Err in this Fm" column shows the current slave frame error. It is calculated by taking the difference between the actual and desired frame count and dividing by 9. This value is truncated to an integer, giving the same result as the converted phase register value read by the program.

Finally, the "Ending PE" column adds the error from the previous frame to the error in this frame to give the cumulative error.

The result of this process is to bring into synchronization the frames to within 2 phase clocks after the initial synchronization period. This initial period is required to make the initial correction from the "correct" value to a real value based on the actual counting rates. Over time, as the crystal temperatures drift and ystem voltages drift, the counting rates will change, and adjustments will be made automatically.

The above calculations assume no error in calculating the phase error. However, a portion of the 0.02% error will show up in the phase error calculation, as well. This can be factored out over time by using the revised timer reload value to recalculate the ratio used in the phase error calculation.

As more slave processors are added, the latency for shared resources, such as the phase register, increases. Thus, another factor in performing synchronization is to compensate for program and bus delays in the system.

Figure 12:
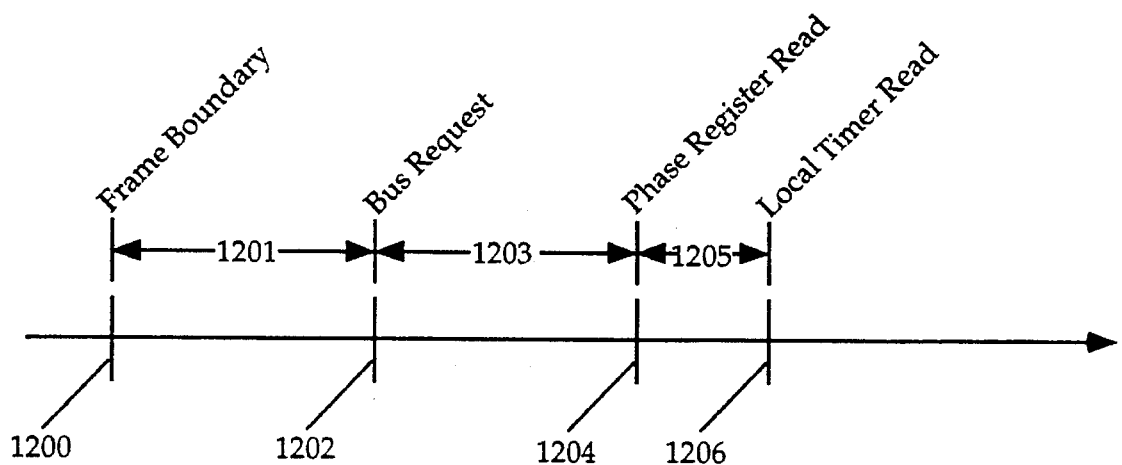
FIG. 12 is a timeline which illustrates various delays.

FIG. 12 is a timeline which shows these delays. When the timer/counter generates an interrupt at time 1200 to the slave processor, there is some time which elapses prior to retrieving the routine for reading the phase register. This is indicated in FIG. 12 as program delay time 1201. At time 1202, a request is issued to read the phase register. Some amount of time elapses before a grant is received and data is returned from the phase register. This is known as the bus delay time 1203. Bus delay time 1203 is a function of other bus transactions in progress, as well as the priority of the requesting processor. The data from the phase register is driven by one or more bus drivers and is received at time 1204. It is important that phase register read operations do not return false values (i.e. phase register is synchronous). Once the phase register read instruction has been completed, the local timer value is read at time 1206. The timer read delay 1205 is a fixed, known value and is typically insignificant.

In the currently preferred embodiment of the present invention, the timer/counter value is used to calculate the actual value of the converted phase register at the time when the timer interrupt had occurred. Thus, the delays 1201 and 1203 are not significant. The value of 1205 is significant, but since it is a known and very small value relative to the phase register counting rate, the algorithm can adjust from synchronization to the maximum accuracy of the phase register.

A transition frame calculation is now described. Referring to FIG. 10, the transition frame calculation is performed during unsynchronized frame 1002. This calculation results in a transition frame timer value, which is stored in the timer reload register prior to the end of frame 1002. During transition frame 1006, the "correct" value for the timer reload register is restored, resulting in subsequent frame 1007 being initially closely synchronized. This "correct" value is the value required to generate the frame size desired, assuming no clock errors. For example, if the timer was counting at 2 MHz, a timer reload value of 20,000 would be required to generate 10 ms frames. It is this "correct" value that the fine synchronization program described earlier adjusts to maintain synchronization. This fine synchronization program begins running in frame 1007 and runs once per frame thereafter.

In the same manner as before, the master phase register and local timer/couter is sampled during frame 1002. The values are used to calculate the converted phase register value at the frame boundary between frame 1001 and 1002. This converted phase error value is then subtracted from the converted phase register maximum value plus one. The difference 1010 is the remaining time to the end of a master frame at the current slave frame boundary. Referring to FIG. 10, this is essentially the same value as frame 1006.

This number is then multiplied by the counting ratio of the local timer to the converted phase register. This results in the correct timer value to give a frame of the correct length for transition frame 1006.

The following example demonstrates a transition frame process:

```
max phase register=999
max converted phase register=499
max timer register=1999
ratio=(1999+1)/(499+1)=4
sampled phase register=372
converted phase sample=372
sampled timer=844
elapsed=2000-844=1156
phase elapsed=1156/4=289
since 289<372, use the "else" if clause
slave phase=372-289=83
time remaining to end of master frame=500-83=417
convert to timer units:   417*4=1668
```

The value 1668 is loaded into the timer reload register during frame 1002. This value is automatically loaded into the timer when the counter counts to zero at the end of frame 1002 and generates a short frame 1006. During frame 1006, the "correct" value 1999 must be reloaded into the timer reload register. This "correct" value is then automatically loaded into the timer at the end of the transition frame and generates frame 1007.

During frame 1007, the fine synchronization program runs and may slightly adjust the timer reload value. The adjusted value does not actually take effect until frame 1008.

Synchronization of Data I/O Streams

Given two processing units having a DSP, a phase register, and serial audio data streams, the act of synchronizing one of the DSP's (the slave) frame rate to the other (the master) as described above, might result in the slave processor no longer being synchronized to its own data stream. Whereas the slave processor is synchronized to the data stream of the master, it loses the data synchronization to its own DMA subsystem.

This loss of data synchronization might occur because the sample rate is typically slightly different between the slave and the master. After a period of time, the I/O subsystem input stream provides one too many or one too few data samples in a given frame. During the same frame, the output stream either uses one less sample than was generated or requires one additional sample.

For instance, given 24000 samples per second and a clock error of ±0.01%, the worst case sample rate error is 4.8 samples per second (assuming one crystal is 0.01% fast and the other is 0.01% slow). This translates to approximately one sample dropped or one extra sample every 200 ms.

The phase register of the slave processor can be utilized to establish data synchronization in a manner similar to the process described for frame synchronization. Both input and output data streams are double buffered, as described earlier. Next, the location of the data buffer I/O pointers at the frame boundary is calculated. This calculation is very similar to the one described for frame synchronization, except that the phase register value is not converted. The reason is that the unconverted phase register, running at a cycle rate of ½ the frame rate, gives the offset into the I/O buffers.

The data synchronization process can be handled on multiple DSPs that are part of the master set. The slave DSPs' phase register and the local DSPs' timer is read, rather than the master's phase register. Any of the DSPs, including the master, can handle the I/O resynchronization process for a given slave processor. Typically, it is the slave processor associated with the I/O channel, which accomplishes this.

The phase register value at a slave frame boundary is then computed using the same type of calculation as described above. This value is converted into an address offset by shifting the value right n places, where n is the number of prescaler bits (e.g., 6 in the currently preferred embodiment), and adding the result to the base address. This recovers the address offset that the DMA channel was using when the frame boundary passed. The actual input and output sample pointers can be recovered by adding this value to the base address for the input buffer and the base address for the output buffer. Due to the double buffering process, the offset alternates between two values on subsequent frames. For subsequent frames, extra or missing data samples can be determined based on the calculated address offset. An extra data sample causes a larger than expected offset, whereas a missing sample causes a smaller than expected offset. Once the offset is determined, data resynchronization begins.

Data resynchronization requires a processing algorithm in addition to the phase register algorithm described above, because the data is arriving or leaving at a slightly different rate than the processor is taking or generating data. In essence, a sample rate conversion technique is required to perform data resynchronization.

Theoretically, an algorithm attempting to generate exactly N samples per frame from a stream that has slightly more or less samples, or conversely, attempting to generate a stream with slightly more or slightly less samples per frame from exactly N samples per frame requires an additional buffer. This is because hardware requires that exactly the produced samples be taken every frame or that exactly the required samples be generated. If the input process or output process maintains a small history buffer, the history buffer can contain the extra samples or provide the missing samples. Meanwhile, the processing algorithm adjusts and corrects the loss or gain of samples by accepting or generating samples slightly faster or slightly slower. The result is a slowly changing process that adapts to changes in the number of samples in the history buffer.

For example, assume that an input process uses a 16-sample history buffer. The objective is to maintain this buffer with 8 samples. Starting with 8 samples of silence in the buffer, these 8 samples plus X-8 samples from the input buffer are fed to the sample rate convertor portion of the input process, where X is the desired number of samples per frame. Initially, the sample rate convertor is running with a conversion ratio of exactly 1.00000. The remaining 8 samples from the input buffer goes into the history buffer, and would be the first 8 samples in the following frame. This process continues until an extra sample is received or a missing sample is detected. The result is that X samples flow out of the input process to a frame-synchronous process using the data. However, the history buffer now contains either 7 or 9 samples. This fact is known by the input process. The input process also knows how many samples were received before the occurrence of the extra/missing sample. Consequently, the process can determine a first estimate of the rate error and could begin gradually moving the conversion rate towards the estimated value.

As more data errors occur, the history buffer becomes more full/empty, until the conversion process takes corrective action. Thus, data synchronization is achieved by the input process maintaining a half-full history buffer over time, and not allowing the buffer to either overflow or underflow.

A similar algorithm can be used for outputting data. In an output case, the history buffer is placed between the output process and the output buffer. The rate conversion calculation for the output is the same as for the input. Typically, only one determination of the conversion rate need be made.

The resynchronization process is similar for input data streams and output data streams. Given an input stream, the first step is to clear the input buffer and the history buffer. Next, the serial port is initiated, with the port beginning its dump at the beginning of the buffer and automatically wrapping around after two frames of data have been received. Sometime in the next frame, the input process algorithm is run. Note that this method eliminates the critical timing requirement for initializing a serial port at a frame boundary. As described earlier, the slave phase register and local timer are read and are used to calculate the DMA pointers at the frame boundary.

Figure 13:
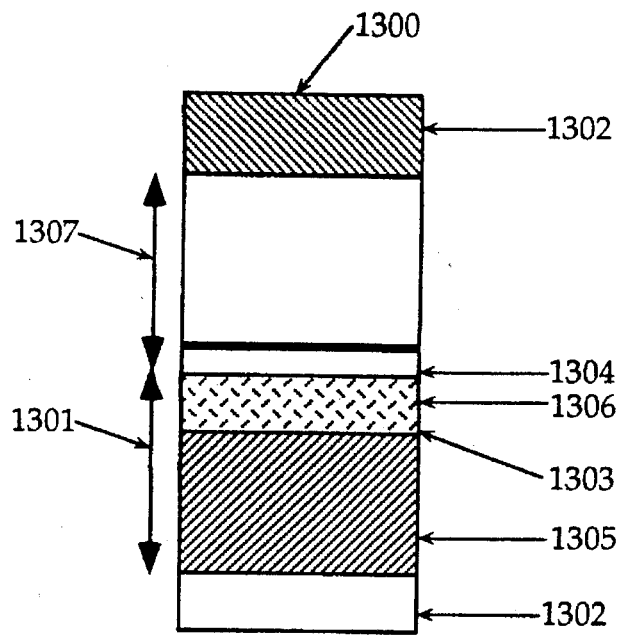
FIG. 13 illustrates an input buffering mechanism.

Referring to FIG. 13, the input buffer 1300 contains some number of input samples 1301, and the rest is silence samples 1302. Since the DMA pointer 1303 is computed at the beginning of the frame, the current DMA pointer 1304 is actually different than the computed value 1303. Since this is the first time the input processor task has run, the previous X samples (one frame's worth) is taken from the buffer 1302 and 1305 (silence followed by samples). The data passed on to downstream processes comprises the 8 samples from the history buffer and X-8 samples from the input buffer. The oldest 8 samples from the input buffer is stored in the history buffer.

During the following frame, the computed sample pointer is X samples away from the previous value, and the input task can access the XX previous samples. These samples are 1306 and 1307, shown in FIG. 13.

Over subsequent frames, the calculated pointer alternates between the initial two values, until at some point, a sample is missing or an extra sample appears. This occurrence is detected by noting a change in the computed DMA pointer. When this happens, the missing sample is supplied from the history buffer or the extra sample is absorbed by the history buffer, as described earlier.

The conversion process should not be rapidly readjusted when the frame boundary is drifting past a data sampling boundary. Hence, no action should be taken until there are 2 extra samples or 1 too few samples. If there is the exact number of input samples or one extra, no change is made to the conversion rate. If there is one less or two extra samples the conversion rate is modified.

Figure 14:
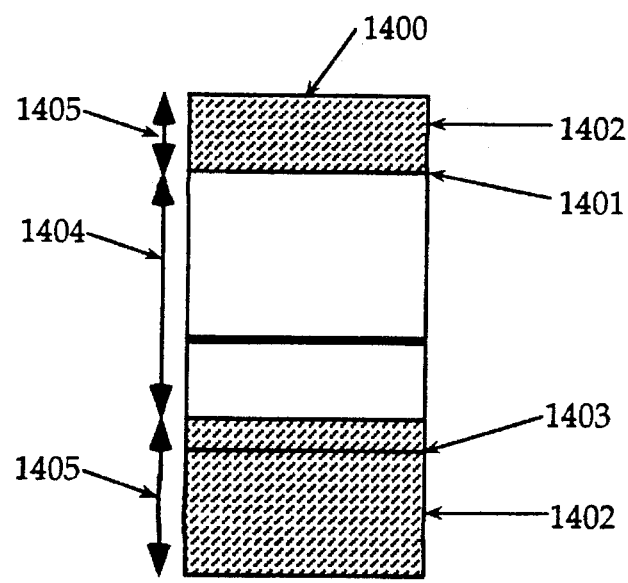
FIG. 14 illustrates an output buffering mechanism.

A similar mechanism is used for output ports. FIG. 14 illustrates an output buffer 1400. The computed value of the output DMA pointer 1401 determines where the output port was getting its data from at the beginning of this frame (e.g., from last frame's output data 1402). By the time the DSP receives this information, the output serial process has already transmitted part of the data from the last frame to the output channel as indicated by pointer 1403.

The startup process is similar for the output processes. Silence samples are stored in the entire output buffer and in the output history buffer. Typically, both input and output are started together, and are tied together in hardware. During the next frame the output task is run.

In most cases, a majority of a frame has elapsed since the pointer was sampled (i.e., at the beginning of the frame). This is due to the fact that the input task runs early in a frame, and the output task runs late in a frame. In between is the realtime processing.

Since this is the first frame that the output process has run, X samples 1404 are stored in the output buffer just before the pointer 1401. These samples comprise 8 samples from the computed output history buffer plus X-8 samples from the sample rate converted output data stream. Note that the initial conversion rate is exactly 1.0000. The last 8 samples go into the history buffer.

The serial port soon begins to output the new data, starting approximately at the end of the current frame and at the beginning of the next one. One frame later, when the output process is run, the computed sample pointer is X locations offset from the previous value. Therefore, the new output samples 1405 are stored in the correct location immediately after the samples 1404.

This process continues until at some point, the computed pointer is not exactly X locations from the previous value. If the I/O port is running ahead, an extra output sample should be taken from the history buffer for the current frame. Note that the last sample is not overwritten from the previous frame because the data is stored directly up against the computed pointer.

If the port is running one sample behind, then one less sample is moved to the buffer. The extra sample is stored into the history buffer. The output process conversion rate can be derived by using the rate computed by the input process or can be independently derive it using the same method.

Figure 15:
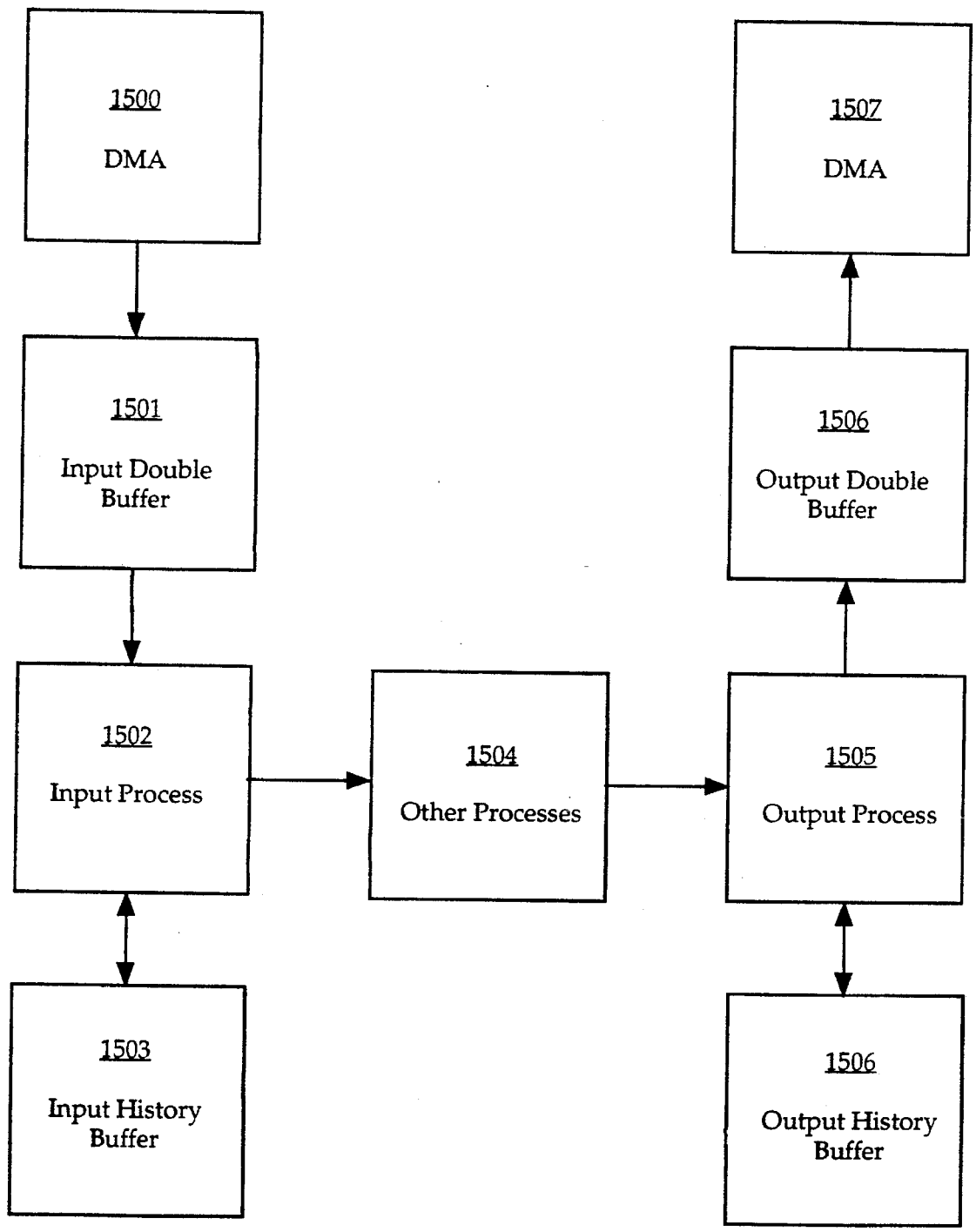
FIG. 15 illustrates a data resynchronization mechanism.

FIG. 15 illustrates a block diagram of the data I/O resynchronization mechanism. The slave DMA 1500 I/O channel to be resynchronized is coupled to input double buffer 1501. Either X-1, X, or X+1 samples per frame is sent to an input process 1502. The input process 1502 concatenates the samples received from the input double buffer 1501 to the samples taken from the input history buffer 1503. Input process 1502 takes the number of samples it needs for its sample rate converter to generate exactly X samples to be sent to the other processes 1504. Thereby, input process 1502 supplies X samples per frame to the other processes 1504, resulting in input data synchronization. Likewise, for output data synchronization, the other processes 1504 supplies X frame synchronous output samples to an output process 1505. These output samples are processed by a sample rate converter in the output process 1505 and the resulting samples are concatonated with the samples stored in the output history buffer 1506. The output process 1505 then outputs X-1, X, or X+1 samples to the output double buffer 1506. The remaining samples are dumped in the output history buffer 1506. Output double buffer 1506 outputs these samples to an output DMA I/O channel 1507.

Note that this method of resynchronization does not require synchronization hardware to be connected between the DSPs. Furthermore, this method eliminates the need for time-critical relationships in starting up input and output channels (e.g., serial ports). Also, the synchronization software is not time critical, so long as it is run sometime during each frame.

Thus, an apparatus and method of synchronizing the frames of one or more slave processors to the frames of a master processor and of synchronizing the data of two separate I/O channels attached to the master and slave processors by implementing a phase register, is disclosed.

What is claimed is:

1. In a computer system having a first processor, a second processor, a storage device and a timer, said first processor processing a first frame set, said first frame set being divided into a first plurality of frames by a first plurality of frame boundaries, each of said first plurality of frames including a plurality of samples, said second processor for processing a second frame set, said second frame set being divided into a second plurality of frames by a second plurality of frame boundaries, a method for synchronizing said first frame set with said second frame set comprising the steps of:
    a) incrementally adjusting a value in said storage device;
    b) reading a current value in said storage device after incrementally adjusting said value in said storage device at step a);
    c) reading a current timer value in said timer, said current timer value indicating a time period lapsed since a restart of said timer wherein said timer restarts at an occurrence of one of said second plurality of frame boundaries;
    d) determining an old value that was stored in said storage device when said timer was restarted, said old value determined based on said current value of said value in said storage device and said current timer value of said timer;
    e) converting said old value into timer units; and
    f) changing a frame length of said second plurality of frames by an amount of said timer units.

2. The synchronization method of claim 1 further comprising the step of generating a transition frame after a start-up of said computer system, wherein said transition frame is inserted into said second plurality of frames, and said transition frame terminates at an occurrence of a next frame boundary of said first plurality of frames wherein initial synchronization is achieved between said first plurality of frames and said second plurality of frames.

3. The synchronization method of claim 1 wherein said timer units are determined by:
    a) subtracting said old value from a maximum storage device value to obtain a difference value;
    b) computing a ratio which is defined as:
       (a frequency at which a value in said timer is incrementally adjusted)/(a frequency at which a value in said storage means is incrementally adjusted); and
    c) multiplying said difference value by said ratio.

4. In a computer system having a master processor, a slave processor, an output buffer and a timer, said master processor having a phase register, a down-counter, a buffer size register and a base address register, said master processor for processing a master frame set, said master frame set being divided into master frames by master frame boundaries, each of said master flames having a plurality of samples, said phase register having a prescaler and an address register, said address register having a first value indicating an address of one of said samples in one of said master frames, said prescaler coupled to said address register and said down counter, said prescaler having a second value which comprises N distinct quantities, said phase register having a third value comprised of said first value in said address register and said second value in said prescaler, said buffer size register coupled to said down-counter and including a fourth value indicating a size of said output buffer, said base address register coupled to said address register and including a fifth value indicating a base address of said output buffer, said slave processor for processing a slave frame set, said slave frame set being divided into slave frames by slave frame boundaries, a method for synchronizing said slave frame set with said master frame set comprising the steps of:

a) incrementing said second value in said prescaler;
   b) incrementing said first value in said address register;
   c) decrementing a sixth value in said down-counter when said prescaler overflows, wherein said prescaler overflows when said second value in said prescaler has incrementally comprised each of said N distinct quantities;
   d) loading said fourth value in said buffer size register into said down-counter when said down-counter underflows, wherein said down-counter underflows when said down-counter has counted up to the fourth value in said buffer size register;
   e) loading said fifth value in said base address register into said address register when said down-counter counts twice the fourth value in said buffer size register;
   f) during said steps a),e) reading a current value of said third value in said phase register and a current timer value in said timer, said current timer value of said timer indicating a time period lapsed since a restart of said timer wherein said timer restarts at an occurrence of one of said slave frame boundaries;
   g) calculating an old value of said third value in said phase register said old value present when said timer was restarted, said old value calculated based on said current value of said third value in said phase register read at step f) and said current timer value of said timer read at step f);
   h) converting said old value into timer units; and
   i) adjusting a slave frame length by an amount of said timer units.

5. The synchronization method of claim 4 wherein said prescaler is incremented at a frequency of $2^n$ times a rate said master processor is sampling at, where n is the number of prescaler bits.

6. The synchronization method of claim 4 further comprising the step of generating a transition frame after a start-up of said computer system, wherein said transition frame is inserted into said slave frames, and said transition frame terminates at an occurrence of a next frame boundary of said master frame boundaries wherein initial synchronization is achieved between said master frames and said slave frames.

7. The synchronization method of claim 4 wherein said timer units are determined by:
   a) subtracting said old value from a maximum phase register value to obtain a difference value;
   b) computing a ratio which is defined as:
      (a frequency at which a value in said timer is incrementally adjusted)/(a frequency at which a value in said phase register is incrementally adjusted); and
   c) multiplying said difference value by said ratio.

8. A computer system for synchronizing a first frame set with a second frame set comprising:

a first processor for processing said first frame set, said first frame set being divided into a first plurality of frames by a first plurality of frame boundaries, each of said first plurality of frames including a plurality of samples;
   a second processor coupled to said first processor for processing said second frame set, said second frame set being divided into a second plurality of frames by a second plurality of frame boundaries;
   a storage device coupled to said first processor, said storage device storing a value;
   an incrementer coupled to said storage device, said incrementer incrementally adjusts said value in said storage device;
   a timer coupled to said second processor, said timer having a timer value, said timer value being restarted when one of said second plurality of frame boundaries is encountered, said timer value being incrementally adjusted after being restarted;
   and wherein one of said first processor and said second processor determines an old value that was stored in said storage device when said timer value was restarted wherein said old value is determined based on a current value of said storage device and a current timer value and wherein a frame length of one of said second plurality of frames is adjusted based upon said old value.

9. The computer system of claim 8 further comprising an initializer which generates a transition frame for said second plurality of frames, wherein said transition frame terminates at an occurrence of one of said first plurality of frame boundaries.

10. An apparatus for synchronizing a first frame set with a second frame set comprising:

a first processor for processing said first frame set, said first frame set being divided into a first plurality of frames by a first plurality of frame boundaries, each of said first plurality of frames including a plurality of samples;
   a second processor coupled to said first processor for processing said second frame set, said second frame set being divided into a second plurality of frames by a second plurality of frame boundaries;
   a storage device coupled to said first processor and storing a value;
   an incrementer coupled to said storage device, said incrementer incrementally adjusting said value, wherein said value increases as a function of time, wherein said value is reset when one of said first plurality of frame boundaries is encountered;
   a timer coupled to said second processor, said timer storing a timer value, said timer value being restarted when one of said second plurality of frame boundaries is encountered, said timer value being incrementally adjusted after being restarted; and
   an initial synchronizer coupled to said second processor and generating a transition frame to be inserted into said second frame set to synchronize said first frame set with said second frame set, said transition frame having a frame length determined based on said value in said storage device and said timer value.

11. The computer system as claimed in claim 10 further comprising
   means for increasing and decreasing successive frame lengths of said second frame set based on a current value in said storage means and a current timer value.

12. A computer system for synchronizing data to a frame set, said data including a plurality of samples, said computer system comprising:

a processor for receiving and processing said plurality of samples of said data that are within said frame set, said frame set being divided into a plurality of frames by a plurality of frame boundaries;

a first storage means for storing said samples of said data;

a second storage means for storing a value wherein said value includes prescaler bits and an address of one of said samples of said data stored in said first storage means;

an incrementing means for incrementally adjusting said value stored in said second storage means, wherein said value increases as a function of time and as an address of a consecutive one of said samples of said data is loaded into said second storage means;

a reset means for resetting said value stored in said second storage means when one of said plurality of frame boundaries is encountered;

a timer means for storing a timer value, said timer value being restarted when one of said plurality of frame boundaries is encountered, said timer value being incrementally adjusted after being restarted;

a first read means for reading a current value stored in said second storage means;

a second read means for reading a current timer value stored in said timer means;

means for determining an old value that was stored in said second storage means when said timer value was restarted wherein said old value is determined based on said current value of said second storage means and said current timer value;

means for determining an address offset by shifting out prescaler bits from said old value;

means for determining whether there is an extra or a missing sample in said data in one of said plurality of frames based on said address offset; and a third storage means for storing said extra sample and for providing said missing sample so that said processor receives a predetermined number of samples for each of said plurality of frames.

13. The apparatus of claim 12 wherein said data includes either input data or output data.

14. In a computer system having a processor for receiving and processing data that is within a frame set and a timer, said data including a plurality of samples, said frame set being divided into a plurality of frames by a plurality of frame boundaries, a method of synchronizing said data to said frame set, comprising the steps of:

a) storing said samples of said data in a first storage means;

b) storing a value in a second storage means wherein said value includes prescaler bits and an address of one of said samples of said data;

c) incrementing said value stored in said second storage means wherein said value increases as a function of time and as an address of a consecutive one of said samples of said data is loaded into said second storage means;

d) reading a current value in said second storage means after said value is incremented in step c);

e) reading a current timer value in said timer, said current timer value indicating a time period lapsed since a restart of said timer wherein said timer restarts at an occurrence of one of said plurality of frame boundaries;

f) determining an old value that was stored in said second storage means when said timer was restarted wherein said old value is based on said current value of said second storage means read at step d) and said current timer value read at step e);

g) determining an address offset by shifting out prescaler bits from said old value;

h) determining whether there is an extra or a missing sample in said data in one of said plurality of frames based on said address offset; and i) storing said extra sample if there is said extra sample and providing said missing sample to said processor if there is said missing sample so that said processor receives a predetermined number of samples for each of said plurality of frames.

15. The method of claim 14 wherein said data includes either input data or output data.

16. The method of claim 14 wherein said extra sample is stored in a third storage means, and said missing sample is provided from said third storage means to said processor.

* * * * *